US009459085B2

(12) United States Patent
Lee et al.

(10) Patent No.: US 9,459,085 B2
(45) Date of Patent: Oct. 4, 2016

(54) APPARATUS FOR MEASURING THE SHAPE OF A MATERIAL

(71) Applicant: Hyundai Steel Company, Incheon (KR)

(72) Inventors: Sang Ho Lee, Chungcheongnam-Do (KR); Yong Kook Park, Gyeonggi-Do (KR); Gap Soo Lim, Busan (KR); Jong Hyob Lim, Seoul (KR)

(73) Assignee: Hyundai Steel Company, Incheon (KR)

( * ) Notice: Subject to any disclaimer, the term of this patent is extended or adjusted under 35 U.S.C. 154(b) by 413 days.

(21) Appl. No.: 14/079,098

(22) Filed: Nov. 13, 2013

(65) Prior Publication Data

US 2014/0068957 A1    Mar. 13, 2014

Related U.S. Application Data

(63) Continuation of application No. PCT/KR2011/010013, filed on Dec. 22, 2011.

(30) Foreign Application Priority Data

Jun. 29, 2011 (KR) .................. 10-2011-0063393

(51) Int. Cl.
| | | |
|---|---|---|
| *G01B 5/20* | (2006.01) | |
| *G01B 13/16* | (2006.01) | |
| *B21B 38/02* | (2006.01) | |
| *G01B 5/04* | (2006.01) | |
| *G01B 5/207* | (2006.01) | |
| *B21B 38/04* | (2006.01) | |

(52) U.S. Cl.
CPC .............. *G01B 5/20* (2013.01); *B21B 38/02* (2013.01); *G01B 5/046* (2013.01); *G01B 5/207* (2013.01); *G01B 13/16* (2013.01); *B21B 38/04* (2013.01)

(58) Field of Classification Search
CPC ......... G01B 5/20; G01B 5/207; G01B 13/16
USPC ............................................. 33/552
See application file for complete search history.

(56) References Cited

U.S. PATENT DOCUMENTS

| | | | | | |
|---|---|---|---|---|---|
| 2,612,700 | A | * | 10/1952 | Frisk ...................... | G01B 3/00 33/561.1 |
| 3,680,215 | A | * | 8/1972 | Plough ................... | G01B 5/068 33/501.03 |
| 3,919,779 | A | * | 11/1975 | Piggott .................. | G01B 5/068 33/501.02 |
| 4,068,385 | A | * | 1/1978 | Mitzel .................... | G01B 5/068 209/534 |
| 4,240,206 | A | * | 12/1980 | Baresh ................... | G01B 7/287 33/501.3 |
| 4,271,699 | A | * | 6/1981 | Williamson ........... | G01B 7/107 33/501.02 |
| 4,916,824 | A | * | 4/1990 | Shimazutsu ........... | G01B 7/287 33/533 |
| 6,151,791 | A | * | 11/2000 | Shimazutsu ........... | G01B 7/287 33/533 |

(Continued)

FOREIGN PATENT DOCUMENTS

| | | |
|---|---|---|
| JP | 1976-101558 | 9/1976 |
| JP | 1994-042950 | 2/1994 |

(Continued)

*Primary Examiner* — Christopher Fulton
(74) *Attorney, Agent, or Firm* — Locke Lord LLP; Howard M. Gitten

(57) ABSTRACT

An apparatus for measuring the shape of a material includes: a width roller configured to roll a width of the material; a plurality of transfer rollers arranged in a rear side of the width roller to transfer the width rolled material; and a measurement unit disposed between the transfer rollers to contact the material moved over the transfer rollers to measure the shape of the material.

9 Claims, 9 Drawing Sheets

(56) References Cited

U.S. PATENT DOCUMENTS

| | | | | |
|---|---|---|---|---|
| 6,857,301 B1* | 2/2005 | Bergman | ............... | B21D 1/06 700/154 |
| 6,862,814 B2* | 3/2005 | Bennison | ............... | G01B 7/281 33/551 |
| 7,047,657 B2* | 5/2006 | Goeggelmann | ...... | A61B 5/1077 33/551 |
| 7,918,124 B2* | 4/2011 | Eiting | ............... | G01B 5/285 73/37.7 |
| 8,943,703 B2* | 2/2015 | Hayashida | ............... | G01B 3/22 33/505 |

FOREIGN PATENT DOCUMENTS

| | | |
|---|---|---|
| JP | 06-288755 | 10/1994 |
| JP | 10-103944 | 4/1998 |
| JP | 2006-281286 A | 10/2006 |
| JP | 2010-243248 A | 10/2010 |
| KR | 10-0184951 | 12/1998 |
| KR | 10-2003-0017014 A | 3/2003 |
| KR | 20-2007-0008725 U | 5/2007 |
| KR | 2008-0005824 U | 12/2008 |
| KR | 10-2009-0032387 A | 4/2009 |

\* cited by examiner

APPARATUS FOR MEASURING THE SHAPE OF A MATERIAL

CROSS-REFERENCE TO RELATED APPLICATION

The present application is a continuation of International Application No. PCT/KR2011/010013 filed on Dec. 22, 2011, which claims priority to Korean Application No. 10-2011-0063393 FILED JUN. 29, 2011, which applications are incorporated herein by reference.

TECHNICAL FIELD

The present invention relates to an apparatus for measuring the shape of a material, and more particularly, to an apparatus for measuring the shape of a material, which is capable of precisely measuring the shape of a material through contact with the material.

BACKGROUND ART

In general, a steel manufacturing process includes an iron-making process of manufacturing liquid steel, a steel-making process of removing impurities from the liquid steel, a continuous casting process of casting the liquid steel into solid steel, and a rolling process of rolling the solid steel into a steel sheet or wire. The rolling process refers to a process of passing an intermediate material such as slab or bloom, manufactured during the continuous casting process, between a plurality of rotating rollers and applying a continuous force to enlarge or thin the intermediate material. The rolling process is roughly divided into a hot rolling process and a cold rolling process.

The above-described configuration is a related art for helping an understanding of the present invention, and does not mean a related art which is widely known in the technical field to which the present invention pertains.

SUMMARY

Embodiments of the present invention are directed to an apparatus for measuring the shape of a material, which is capable of precisely measuring the shape of a material through contact with the material.

In an embodiment, an apparatus for measuring the shape of a material includes: a width roller configured to roll a width of the material; a plurality of transfer rollers arranged in a rear side of the width roller to transfer the width rolled material; and a measurement unit disposed between the transfer rollers to contact the material moved over the transfer rollers to measure the shape of the material.

The measurement unit may include: a contact part configured to contact the material; an elevating part configured to lift and lower the contact part; and a pressure sensor configured to measure pressure applied to the elevating part. The contact part may include: a body lifted and lowered by the elevating part; and a rotating part disposed at an end of the body to contact the material. The rotating part may include a roller. The measurement unit may further include a guide disposed at a circumference of the body to guide the body. The guide may have a stepped portion at a top of the guide, and the body has a locking portion formed at a side of the body to be locked to the stepped portion.

A plurality of measurement units may be arranged in a line perpendicular to a transfer direction of the material. The measurement units may include: a central measurement unit that contacts the material at a center of the material; a first side measurement unit disposed at a first side of the central measurement unit to be spaced from the central measurement unit and contact the material at one side of the material, while a distance from the central measurement unit is adjusted; and a second side measurement unit disposed at a second side of the first side measurement unit and contacting the material at the other side of the material, while a distance from the central measurement unit is adjusted.

The apparatus may further include a guide rail disposed perpendicular to the transfer direction of the material, wherein the first side measurement unit and the second side measurement unit are slid along the guide rail to adjust the distance from the central measurement unit. The first and second measurement units may include a guide roller installed at a bottom of the first and second measurement units to reduce friction between the guide rail and the first and second measurement units.

According to the embodiment of the invention, the apparatus for measuring the shape of a material may precisely measure the shape of the material through contact with the material. Furthermore, the apparatus may precisely measure the width of the material through contact with the material. Furthermore, since the apparatus may improve the precision of measurement for the material shape, it is possible to precisely estimate the width spread and recovery of a horizontal rolling process and a width rolling process. Furthermore, it is possible to improve the productivity and quality of hot-rolled products.

BRIEF DESCRIPTION OF DRAWINGS

The above and other aspects, features and advantages of the invention will become apparent from the following detailed description in conjunction with the accompanying drawings, in which.

DETAILED DESCRIPTION

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
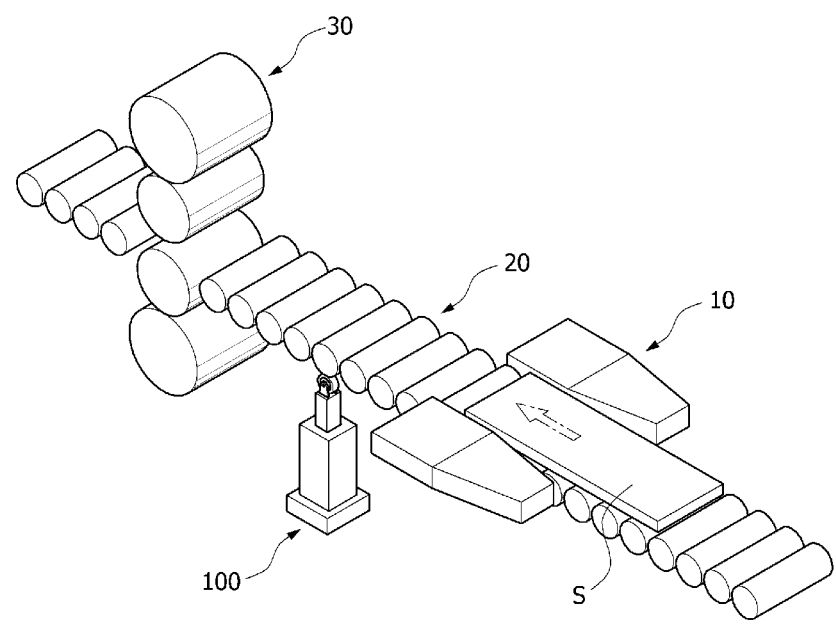
FIG. 1 is a perspective view of an apparatus for measuring the shape of a material in accordance with an embodiment of the present invention.
Figure 2:
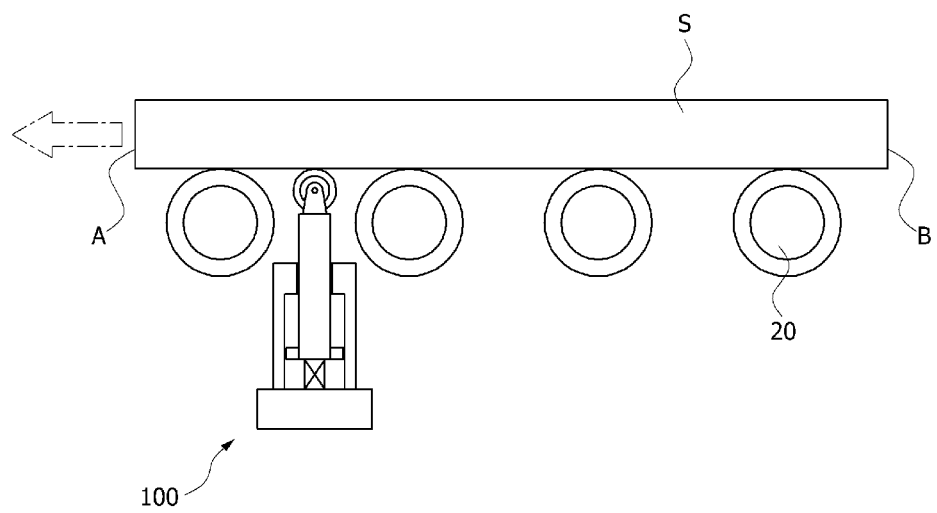
FIG. 2 is a side view of the apparatus for measuring the shape of a material in accordance with the embodiment of the present invention.
Figure 3:
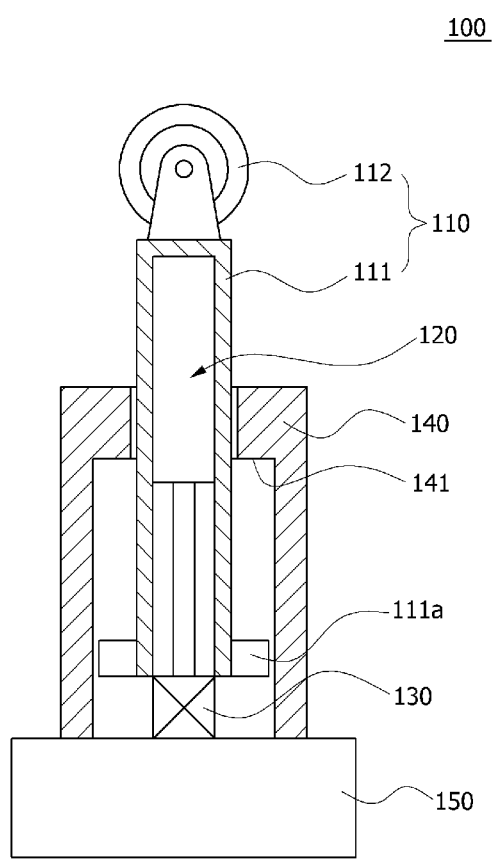
FIG. 3 is a cross-sectional view of a measurement unit in accordance with the embodiment of the present invention.
Figure 4:
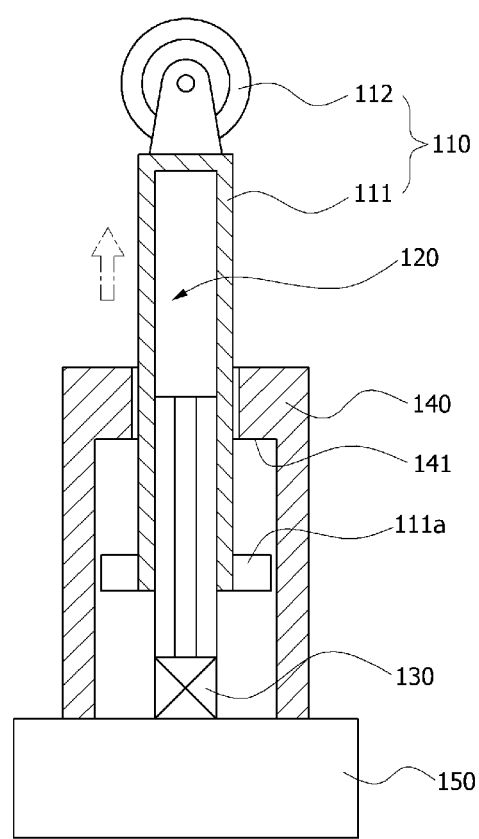
FIG. 4 is a cross-sectional view illustrating a state in which a contact part of the measurement unit in accordance with the embodiment of the present invention is lifted.
Figure 5:
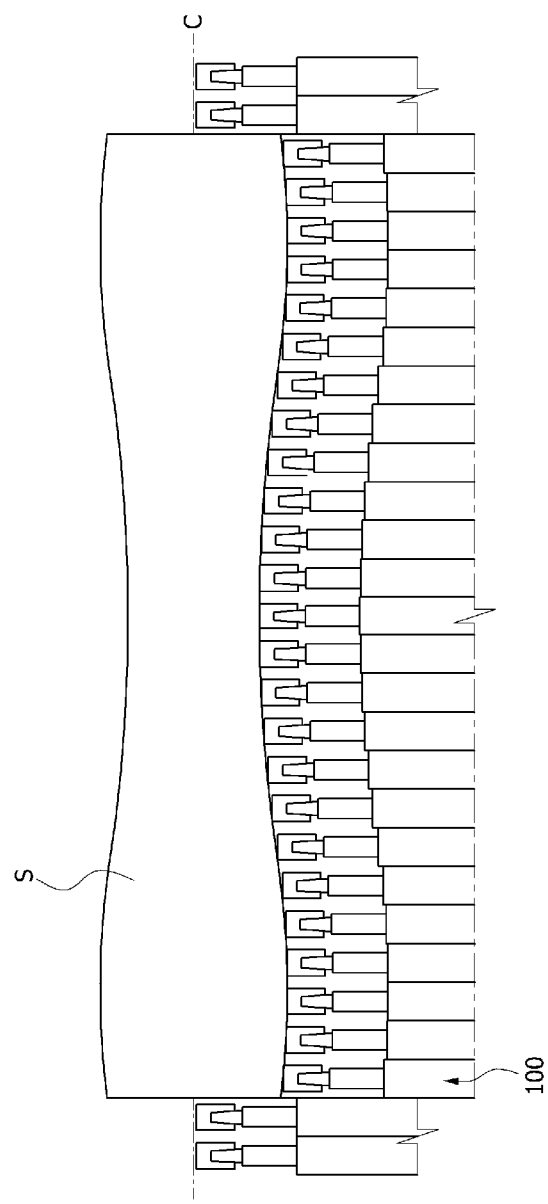
FIG. 5 is a schematic view illustrating an operation state of the apparatus for measuring the shape of a material in accordance with the embodiment of the present invention.
Figure 6:
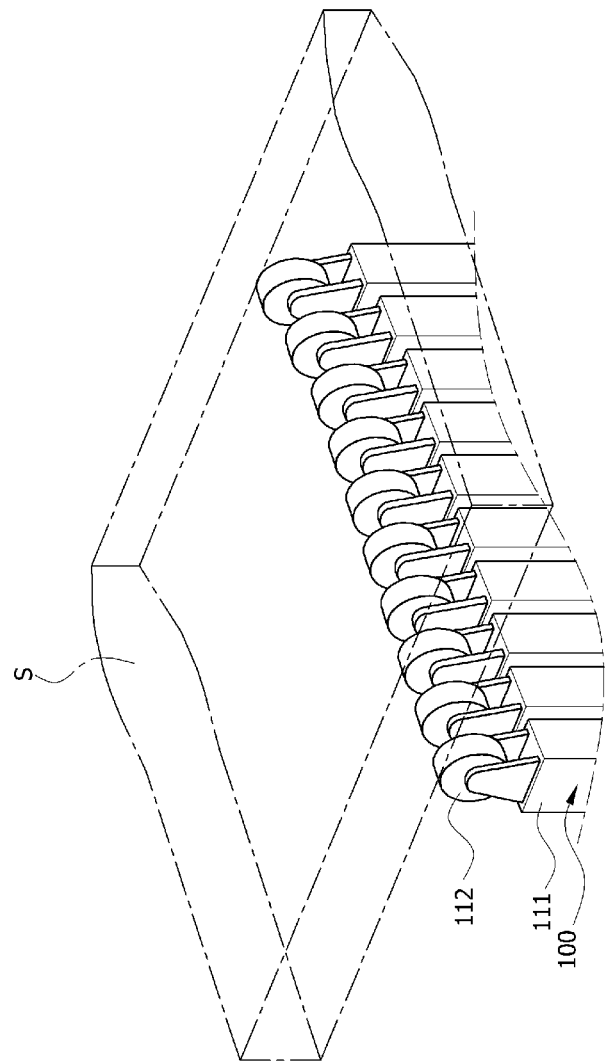
FIG. 6 is a schematic perspective view illustrating the operation state of the apparatus for measuring the shape of a material in accordance with the embodiment of the present invention.

FIG. 1 is a perspective view of an apparatus for measuring the shape of a material in accordance with an embodiment of the present invention. FIG. 2 is a side view of the apparatus for measuring the shape of a material in accordance with the embodiment of the present invention. FIG. 3 is a cross-sectional view of a measurement unit in accordance with the embodiment of the present invention. FIG. 4 is a cross-sectional view illustrating a state in which a contact part of the measurement unit in accordance with the embodiment of the present invention is lifted. FIG. 5 is a schematic view illustrating an operation state of the apparatus for measuring the shape of a material in accordance with the embodiment of the present invention. FIG. 6 is a schematic perspective view illustrating the operation state of the apparatus for measuring the shape of a material in accordance with the embodiment of the present invention.

Referring to FIGS. 1 and 2, the apparatus for measuring the shape of a material in accordance with the embodiment of the present invention includes a width roller 10, transfer rollers 20, and a measurement unit 100.

The width roller 10 serves to roll the width of a material S manufactured during a rough rolling process, in order to control the width of the material S. In the present embodiment, the width roller 10 includes a slab sizing press. The material S rolled through the width roller 10 is transferred to a subsequent process through the transfer rollers 20. The transfer rollers 20 are disposed in a rear side of the width roller 10. The transfer rollers 20 includes transfer rolls to transfer the material S to the subsequent process and a roller support (not illustrated) to rotatably support both ends of the transfer roll.

The measurement unit 100 is disposed under the transfer rollers 20. The measurement unit 100 is disposed between the plurality of transfer rollers 20 arranged in a line and serves to measure the shape of the material S transferred over the transfer rollers 20. The measurement unit 100 comes in contact with the material S so as to measure the shape of the material S. In accordance with the present embodiment, the measurement unit 100 comes in contact with the bottom surface of the material S and measures the shape of the material S. The material S of which the width is rolled by the width roller 10 has top and bottom surfaces which are symmetrical with each other based on a central portion C in FIG. 5. Thus, when the shape of the bottom surface of the material S is measured, the entire shape of the top and bottom surfaces of the material S may be measured.

In the present embodiment, a plurality of measurement units 100 may be arranged in a line in a direction perpendicular to the transfer direction of the material S (refer to FIG. 5). Thus, the bottom shape of the material S may be measured in the widthwise direction of the material S across the entire section of the material S. Reference numeral 30 represents a rough rolling part.

Referring to FIGS. 2 to 4, the measurement unit 100 includes a contact part 110, an elevating part 120, a pressure sensor 130, a guide 140, and a base 150. The contact part 110 comes in contact with the material S. The contact part 110 includes a body 111 and a rotating part 112. The body 111 is lifted or lowered by the elevating part 120. The rotating part 112 is provided at the top of the body 111. As the body 111 is lifted or lowered by the elevating part 120, the rotating part 112 is also lifted or lowered in the same direction. The rotating part 112 comes in contact with the material S. In the present embodiment, the rotating part 112 may include a roller. Thus, when the rotating part 112 and the material S come in contact with each other, friction may be reduced by the roller.

In the present embodiment, the roller is used as the rotating part 112. However, the present invention is not limited thereto, and the roller may be replaced with other structures as long as they can reduce the friction between the material S and the rotating part 112. Representative examples of the rotating part 112 may include a ball bearing.

The elevating part 120 lifts or lowers the contact part 110 such that the contact part 110 comes in contact with the material S. In the present embodiment, the elevating part 120 is disposed in the internal space of the body 111 so as to lift or lower the body 111. In the present invention, the elevating part 120 may include a hydraulic cylinder, and the operation of the elevating part 120 is controlled by a control unit (not illustrated).

The guide 140 is disposed at the circumference of the body 111 so as to guide the body 111. The body 111 is lifted or lowered through a hole formed at the top surface of the guide 140. The circumferential surface of the internal space of the guide 140 is formed to have a shape corresponding to the shape of the outer circumferential surface of the body 111. Thus, as the body 111 is guided by the guide 140, the body 111 may be lifted or lowered without moving in different directions. The guide 140 has a stepped portion 141 formed at the top thereof. The stepped portion 141 serves to prevent the body 111 from coming off from the guide 140, and the body 111 has a locking portion 111a formed at the side thereof so as to correspond to the stepped portion 141.

The pressure sensor 130 measures a pressure applied to the elevating part 120 and then transmits the measured pressure to the control unit. The control unit calculates the bottom shape of the material S based on the transmitted pressure. In accordance with the present embodiment, the pressure sensor 130 is disposed at the bottom of the elevating part 120 so as to measure the pressure applied to the elevating part 120. The base 150 supports the guide 140 from the bottom of the guide 140. Since the pressure sensor 130 is covered by the guide 140 and the based part 150, the pressure sensor 130 is protected from external impact.

Hereafter, referring to FIGS. 5 and 6, the operation principle of the apparatus for measuring the shape of a material in accordance with the embodiment of the present invention will be described.

The material S of which the width is rolled is transferred to the subsequent process by the transfer rollers 20. At this time, when a leading end A of the material S arrives at the installation position of the measurement units 100, the transfer rollers 20 are stopped. At this time, the plurality of measurement units 100 arranged in a line in the direction perpendicular to the transfer direction of the material S are lifted toward the material S according to the control of the control unit. Specifically, the rotating part 112 is lifted by the operation of the elevating part 120.

When the rotating part 112 comes in contact with the material S, the rotating part 112 is not lifted any more. Thus, pressure is applied to the elevating part 120. The pressure sensor 130 measures the pressure applied to the elevating part 120 and transmits the measured pressure to the control unit. The control unit calculates the bottom shape of the material S based on the measurement signal transmitted from the pressure sensor 130. That is, the control unit understands the bottom shape and the entire shape of the material S, based on a difference between the pressures.

Referring to FIG. 5, the bottom surface of the material S is formed to be curved, that is, a thickness from the central portion C to the bottom surface of the material S is different at each point. Thus, a level to which the rotating part 112 is lifted is also different at each point. The level difference between the rotating parts 112 may be measured as the difference between the pressures applied to the elevating parts 120 through the pressure sensor 130.

The measurement units 100 installed at points where the material S does not exist, that is, the measurement units 100 installed at the leftmost and rightmost sides of FIG. 5 do not come in contact with the material S. Thus, the measurement units 100 are lifted to a preset level and then stopped, in order to prevent the measurement unit from being excessively lifted. In the present embodiment, the preset level corresponds to a level to which the measurement units 100 reach the central portion C of the material S.

In accordance with the present embodiment, the width of the material S may be measured only by dividing the plurality of measurement units 100 into the measurement units 100 which come in contact with the material S and the measurement units 100 which do not come in contact with the material S. Referring to FIG. 5, the width of the material S corresponds to the width of the measurement unit 100 coming in contact with the material S.

When the contact between the material S and the measurement units 100 is completed, the transfer rollers 20 are driven again. The measurement units 100 measure the pressure changed through the thickness of the material S while coming in contact with the material S, until the measurement units 100 reach the tail end B of the material S through the leading end A of the material S. While the measured pressure is transmitted to the control unit, the control unit may measure the longitudinal shape of the material S. Furthermore, when the contact between the material S and the measurement units 100 is completely released, the control unit operates the elevating part 120 to lower the contact part 110.

Figure 7:
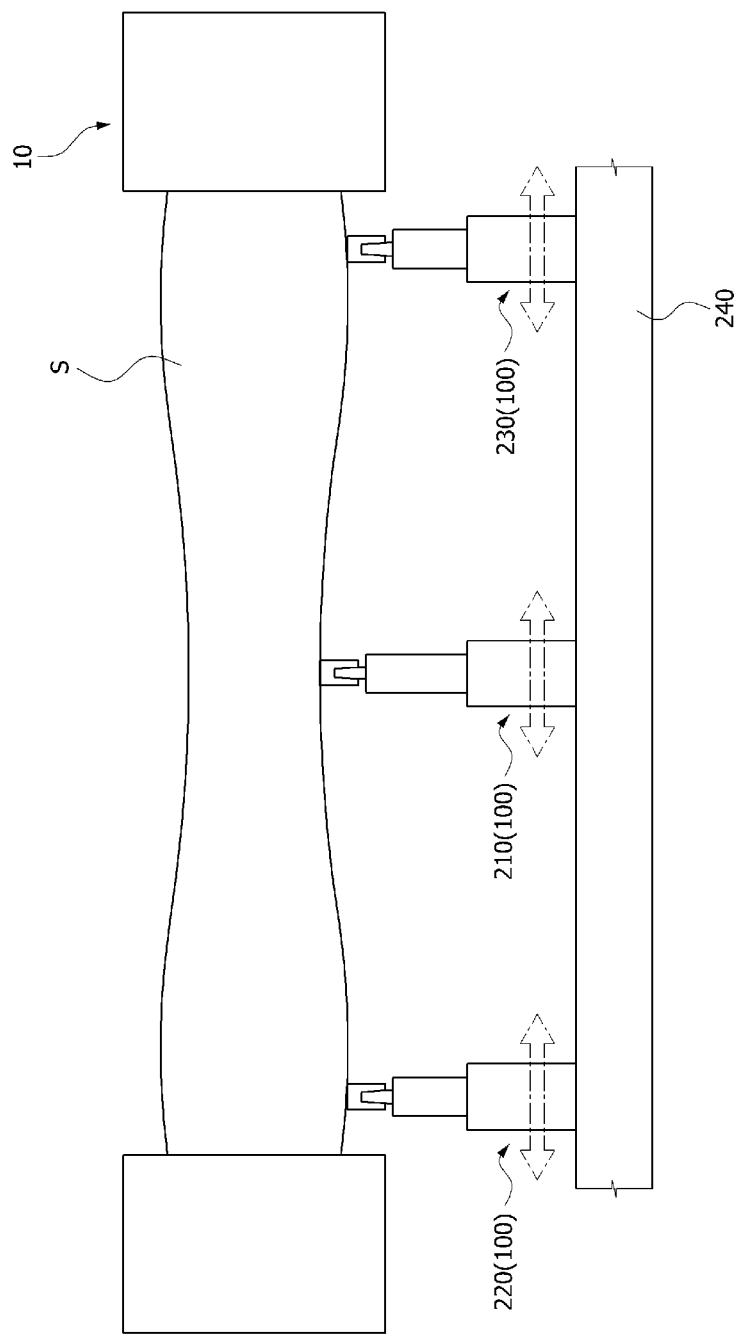
FIG. 7 is a schematic view illustrating an operation state of an apparatus for measuring the shape of a material in accordance with another embodiment of the present invention.
Figure 8:
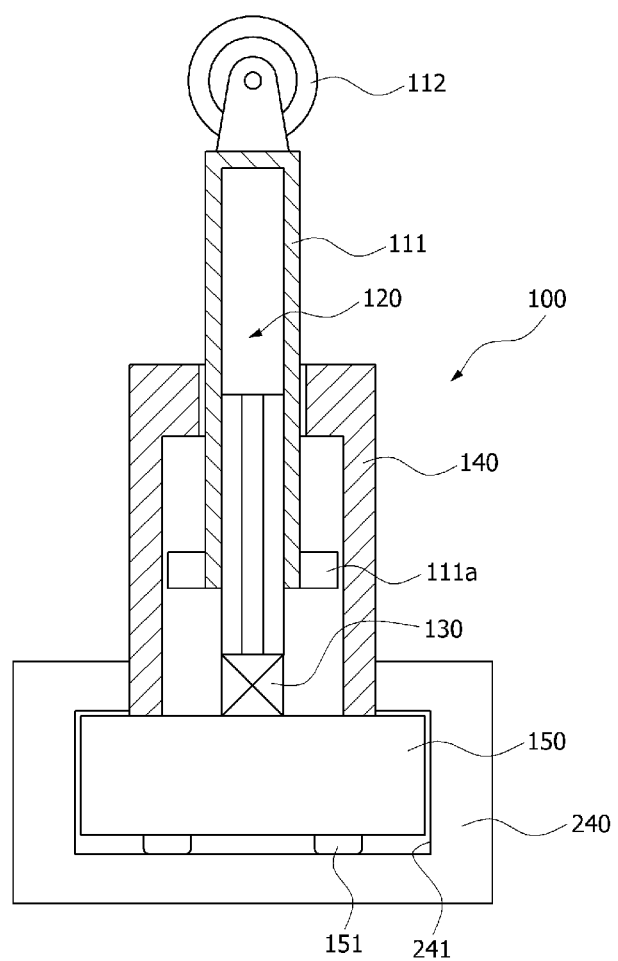
FIG. 8 is a cross-sectional view of a measurement unit of the apparatus for measuring the shape of a material in accordance with the embodiment of the present invention.
Figure 9:
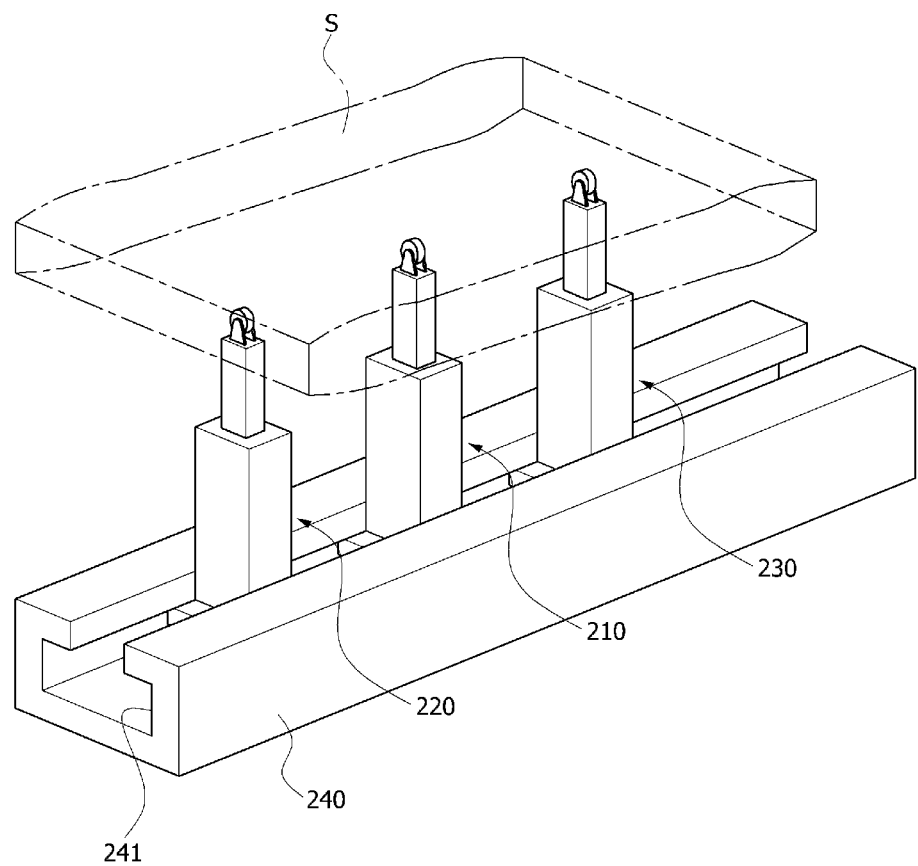
FIG. 9 is a schematic perspective view illustrating the operation state of the apparatus for measuring the shape of a material in accordance with the embodiment of the present invention.

FIG. 7 is a schematic view illustrating an operation state of an apparatus for measuring the shape of a material in accordance with another embodiment of the present invention. FIG. 8 is a cross-sectional view of a measurement unit of the apparatus for measuring the shape of a material in accordance with the embodiment of the present invention. FIG. 9 is a schematic perspective view illustrating the operation state of the apparatus for measuring the shape of a material in accordance with the embodiment of the present invention.

Referring to FIGS. 7 to 9, a measurement unit 100 of the apparatus for measuring the shape of a material in accordance with the embodiment of the present invention includes a central measurement unit 210, a first side measurement unit 220, and a second side measurement unit 230.

The central measurement unit 210 is disposed at the center of the material S and contacted with the material S through operation of an elevating part 120. The first side measurement unit 220 is disposed at one side of the central measurement unit 210 so as to be spaced from the central measurement unit 210. Based on FIG. 7, the first side measurement unit 220 is disposed at the left side of the central measurement unit 210.

While the first side measurement unit 220 is slid along the guide rail 240, a distance from the central measurement unit 210 is adjusted. The first side measurement unit 220 is disposed at one side of the material S, or specifically, at a region corresponding to the left side from the center of the material S, and comes in contact with the material S. The second side measurement unit 230 is disposed in the opposite side of the first side measurement unit 220. Based on FIG. 7, the second side measurement unit 230 is disposed at the right side of the central measurement unit 210.

While the second side measurement unit 230 is slid along the guide rail 240, a distance from the central measurement unit 210 is adjusted. The second side measurement unit 230 is disposed at the other side of the material S, or specifically, at a region corresponding to the right side from the center of the material S, and comes in contact with the material S.

The apparatus for measuring the shape of a material in accordance with the embodiment of the present invention further includes the guide rail 240. The guide rail 240 is disposed in a direction perpendicular to the transfer direction of the material S. Thus, while each of the first side measurement unit 220 and the second measurement part 230 is slid along the guide rail 240, the distance from the central measurement unit 210 is adjusted.

The guide rail 240 may have a typical rail shape. That is, the guide rail 240 has a guide groove 241 formed at the center thereof and a hole formed at the top thereof, through which the first or second side measurement unit 220 or 230 is exposed.

The base 150 of the first side measurement unit 220 is inserted and mounted in the guide groove 241. Thus, when the first side measurement unit 220 is slid along the guide rail 240, the movement of the base 150 in different directions is limited by the guide groove 241. Therefore, the first side measurement unit 220 does not come off from the guide rail 240, while the distance from the central measurement unit 210 is adjusted. The base 150 of the first side measurement unit 220 includes a guide roller 151 installed at the bottom thereof. The guide roller 151 reduces friction between the guide groove 241 and the first side measurement unit 220. Through the guide roller 151, the first side measurement unit 220 may be more smoothly slid inside the guide rail 240.

Similarly, the base 150 of the second side measurement unit 230 is inserted and mounted in the guide groove 241. Thus, when the second side measurement pat 230 is slid along the guide rail 240, the movement of the base 150 in different directions is limited by the guide groove 241. Thus, the second side measurement unit 230 does not come off from the guide rail 240, while the distance from the central measurement unit 210 is adjusted. The base 150 of the second side measurement unit 230 includes a guide roller 151 installed at the bottom thereof. The guide roller 151 reduces friction between the guide groove 241 and the second side measurement unit 230. Through the guide roller 151, the second side measurement unit 230 may be more smoothly slid inside the guide rail 240.

The central measurement unit 210 may be installed to slide inside the guide rail 240. In this case, the base 150 of the central measurement unit 210 is inserted and mounted in the guide groove 241. Thus, the central measurement unit 210 does not come off from the guide rail 240, while the central measurement unit 210 is slid along the guide rail 240. Furthermore, the base 150 of the central measurement unit 210 may include a guide roller 151 installed at the bottom thereof. The guide roller 151 reduces friction between the guide groove 241 and the central measurement unit 210. Through the guide roller 151, the central measurement unit 210 may be more smoothly slid inside the guide rail 240. The central measurement unit 210 may be fixed to the guide rail 240 so as not to slide over the guide rail 240.

Since the first side measurement unit 220 is installed to slide over the guide rail 240, the distance between the first side measurement unit 220 and the central measurement unit 210 may be adjusted according to the width of the material S. Similarly, the distance between the second side measurement unit 230 and the central measurement unit 210 may be adjusted according to the width of the material S. For example, when the shape of a material having a larger width than the material S of FIG. 7 is intended to be measured, the first side measurement unit 220 is moved to the left side, and the second side measurement unit 230 is moved to the right side. Through such a process, the first side measurement unit 220 is positioned at a left end of the material, and the second side measurement unit 230 is positioned at a right end of the material. Then, the measurement units 210, 220, and 230 are lifted through the elevating part 120, and pressure caused by the contact with the material S is measured to calculate the bottom shape of the material S. Then, the bottom shape and the entire shape of the material S may be measured on the basis of the calculated shape.

As such, when the distances between the first and second side measurement units 220 and 230 and the central measurement unit 210 are adjusted, the bottom shape of the material S may be precisely measured through three measurement units. Thus, since actually-measured data are applied to a formula model instead of estimated data, it is possible to precisely estimate the width spread and recovery of a horizontal rolling process and a width rolling process.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

What is claimed is:

1. An apparatus for measuring the shape of a material, comprising:
    a width roller configured to roll a width of the material;
    a plurality of transfer rollers arranged in a rear side of the width roller to transfer the width rolled material; and
    a measurement unit disposed between the transfer rollers to contact the material moved over the transfer rollers to measure the shape of the material; a contact part configured to contact the material; an elevating part configured to lift and lower the contact part; and a pressure sensor operatively coupled to the elevating part to measure pressure applied to the elevating part.

2. The apparatus of claim 1, wherein the contact part includes:
    a body lifted and lowered by the elevating part; and
    a rotating part disposed at an end of the body to contact the material.

3. The apparatus of claim 2, wherein the rotating part includes a roller.

4. The apparatus of claim 2, wherein the measurement unit further includes:
    a guide disposed at a circumference of the body to guide the body.

5. The apparatus of claim 4, wherein the guide has a stepped portion at a top of the guide, and the body has a locking portion formed at a side of the body to be locked to the stepped portion.

6. The apparatus of claim 1, wherein a plurality of measurement units are arranged in a line perpendicular to a transfer direction of the material.

7. The apparatus of claim 6, wherein the measurement units include:
    a central measurement unit that contacts the material at a center of the material;
    a first side measurement unit disposed at a first side of the central measurement unit to be spaced from the central measurement unit and contact the material at one side of the material, while a distance from the central measurement unit is adjusted; and
    a second side measurement unit disposed at a second side of the first side measurement unit and contacting the material at the other side of the material, while a distance from the central measurement unit is adjusted.

8. The apparatus of claim 7, further comprising:
    a guide rail disposed perpendicular to the transfer direction of the material,
    wherein the first side measurement unit and the second side measurement unit are slid along the guide rail to adjust the distance from the central measurement unit.

9. The apparatus of claim 8, wherein the first and second measurement units include a guide roller installed at a bottom of the first and second measurement units to reduce friction between the guide rail and the first and second measurement units.

* * * * *